3,466,139
UTILIZATION OF SEA WATER
Kazuhiko Mihara and Takashi Yamashiki, both of 504 Idokubo Okubocho, Minami-ku, Yokohama, Japan
Continuation-in-part of application Ser. No. 245,360, Dec. 13, 1962. This application Apr. 19, 1967, Ser. No. 631,987
Claims priority, application Japan, Mar. 6, 1962, 37/8,154; May 17, 1962, 37/19,609, 37/19,610, 37/19,611
Int. Cl. C01d 1/04, 5/00; C01f 5/14, 11/18
U.S. Cl. 23—42                                                   1 Claim

ABSTRACT OF THE DISCLOSURE

A process for producing sodium hydroxide from sea water by passing the sea water through an OH-type resin whereafter the resin is continuously regenerated with a lime milch slurry; and a process for recovering Na, Mg, Ca and $SO_4$ from sea water using the aforesaid sodium hydroxide in the production of $Mg(OH)_2$, $CaCO_3$ and $Na_2SO_4$.

Figure 1:
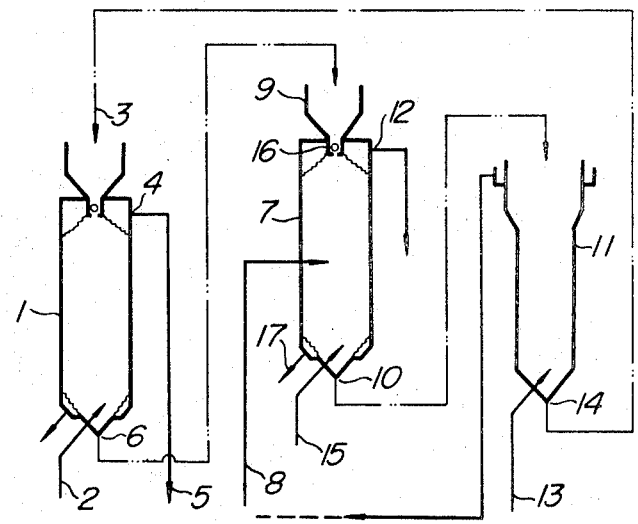

This application is a continuation-in-part of application Ser. No. 245,360, filed Dec. 13, 1962, now abandoned.

DETAILED DESCRIPTION

This invention relates to the utilization of sea water in a very efficient and economical manner.

Various attempts have been made for beneficially utilizing sea water. The known procedures allow only partial utilization and not full utilization of sea water, and fully successful processes have never been achieved.

As is known, sea water contains mainly Na, Mg, Cl and $SO_4$. A method of recovering all four of these components in an economical process is considered extremely desirable.

Conventionally, sea water is concentrated to saline water and crystallized components are obtained therefrom. In the use of such techniques, calcium is recovered as calcium sulfate ($CaSO_4$) which may cause scaling. Moreover, magnesium is recovered as magnesium chloride which causes many disadvantages, namely: decreased electric-power efficiency in dialysis and using ion-exchange membranes; increase of the boiling point for evaporation; and decrease in NaCl yield when brine is withdrawn. It accordingly appears that the prior removal of calcium as well as magnesium from sea water will serve to simplify the procedures of concentration and crystallization, and will result in decreased costs and improved quality of the product.

In magnesia clinker-manufacturing plants, magnesium hydroxide ($Mg(OH)_2$) is usually precipated from sea water by the addition of lime milch. However, calcium remains in the resulting supernatant while considerable impurities entrain the lime milch in the magnesium hydroxide precipitate, whereby the quality of said magnesium hydroxide is lowered and other complications are caused in the operation. It therefore appears that, if the magnesium hydroxide can be obtained without the use of lime milch, it would be possible to effect a considerable improvement in the quality of the product and simplification of the operation.

The use of sodium hydroxide may be considered in the combination of steps for obtaining sodium chloride and magnesium hydroxide from sea water for a better quality product. When sodium hydroxide is added to sea water, pure magnesium hydroxide precipitates while a supernatant free from magnesium is obtained. Further, by removing calcium from the supernatant as calcium carbonate by the addition of a suitable carbonic acid ion resulting from $CO_2$, $Na_2CO_3$, or the like, both the magnesium and calcium in sea water are completely removed.

Partly purified sea water, i.e,. sea water freed from calcium and magnesium is thus obtained. This partly purified sea water is then further concentrated to saline water which may be used as a raw material for soda electrolysis or for the preparation of edible crystalline salt. On the other hand, the obtained $Mg(OH)_2$ has a variety of uses, e.g., as magnesia clinkers, metallic magnesium, etc.

The above-mentioned purification process which comprises purification of calcium- and magnesium-bearing saline water with sodium hydroxide or sodium carbonate is conventionally practiced in soda-electrolyzing plants and, therefore, if the sea water is treated with sodium hydroxide which is itself separately obtained from the sea water, a truly epoch-making process for sea water utilization results.

The sodium hydroxide to be used for the purification of sea water may be of dilute concentration and may contain sodium chloride. To produce such a sodium hydroxide solution as is suitable for the purpose, a continuous ion-exchange apparatus is employed in the present invention.

A most inexpensive alkali source for the production of the sodium hydroxide is lime milch. With respect to methods for the preparation of sodium hydroxide from aqueous lime and aqueous sodium chloride by using anion-exchange resins, many attempts have been made. The prior art, however, suffers from serious disadvantages and such a process has never been commercially established. More particularly, because the solubility of calcium hydroxide is as low as 1500 mg./l. at room temperature, large apparatus and great quantities of water are required for the production of sodium hydroxide. This is uneconomical and not acceptable especially when the supply of industrial water is at a premium. Although various proposals to decrease the requisite amount of water have been made, there is no established plant employing any known method, and this clearly shows the difficulties encountered in their commercial application.

In the present invention, a reaction using lime milch per se in the production of sodium hydroxide has successfully overcome the above difficulties.

An aqueous solution or dilute suspension of lime may be used in the prior art. In the present invention, however, ion exchange resins are continuously transferred, and the reaction solution in slurry form is directly subjected to ion exchange by using an apparatus comprising a circulating vessel, a regenerating vessel and a water-washing vessel.

It is possible to effect ion exchange of the slurry by using an apparatus as disclosed in U.S. Patent No. 3,152,072. One embodiment for this is shown in FIG. 1 in which device 1 is a liquid circulating vessel into which prepurified sea water 2 is fed at the lower portion of the vessel so as to effect countercurrent contact with an OH-type resin fed through the upper portion 3 of the vessel, whereby sea water is mostly converted into NaOH and is taken from treated-liquid outlet 4 provided at the upper portion of the vessel. The resin which has been used in the reaction and which is thereby converted to Cl-type is passed through resin outlet 6 at the lower portion of the vessel to the upper portion of vessel 7. Before entering vessel 7, however, the resin is held in the hopper 9 and is released into the vessel 7 at a determined time cycle. When water is introduced to the lower portion of the vessel 7 at inlet 15, the resin in the vessel is pushed upwardly in the form of layers by means of the hydraulic pressure of the water. Due to the increase of the internal pressure within the vessel, a check valve 16 is closed, whereby the introduction of the resin from the hopper 9 into the vessel is terminated. The $Ca(OH)_2$ slurry 8 introduced at the center part of vessel 7 ascends together with the injected water while effecting contact reaction with the resin. The treated liquid which is a $CaCl_2$ solution is discharged through outlet 12. The Cl-type resin is converted in vessel 7 to OH-type resin and is passed through discharge opening 10 to the upper portion of the water washing vessel 11 by means of the pressure of the water in the vessel 7.

For a predetermined period of time, the above operation is effected. Thereafter, the passage of water is interrupted by operation of a cycle timer. At the same time, liquid is withdrawn through the liquid discharge outlet 17, whereby the internal pressure within the vessel is decreased. Resin from the hopper is then introduced into the vessel 7, and the transfer of the resin from 10 is terminated.

By repeating these procedures, the resin is placed in circulation. In the water-washing vessel, the downwardly transferred OH-type resin which accompanies a large amount of $Ca(OH)_2$ slurry is washed with water 13 injected to the lower portion of the vessel, the overflow portion being reused in the preparatory step of lime milch to avoid the loss of $Ca(OH)_2$. The water-washed OH-type resin is circulated through resin outlet 14 into the liquid circulating vessel 1.

In the above-mentioned steps, if lime milch 8 alone, without the joint use of injected water 15, is fed into the regenerating vessel 7, a coating of $Ca(OH)_2$ is formed at the position to which the resin is upwardly urged, and this inhibits the smooth introduction of the slurry. Therefore, the injection of lime milch at the center part of the vessel should be carried out when the passage of water is terminated, whereby the resin which is normally pressed upwardly in layers by the pressure of the water is released and allowed to descend. Furthermore, the upper discharge opening is free from blockage, because the reaction proceeds in the vessel until the solids disappear, and the reaction liquid may flow at a considerable rate.

By using the apparatus as in accordance with the present invention, the required amount of water is reduced from about 130 tons to about 2 tons per ton of NaCl contained in the sea water. The apparatus may thus be very compact and a commercially acceptable process results.

As a suitable liquid-circulating vessel and a water-washing vessel used herein there may be employed commonly known ion-exchange apparatus in which the resin is transferable.

The dilute NaOH solution obtained at 5 contains some amount of NaCl. Fortunately, since the mobility of $OH^-$ is comparatively greater than that of $Cl^-$ in dialysis using an ion-exchange membrane, the $OH^-$ ion is preferentially passed through the membrane, whereby concentration and purification are simultaneously effected with great convenience. The concentrated solution may be utilized as liquid or solid if required.

As is commonly known, limestone is burned to form lime and carbon dioxide, the form of which is converted to slaked lime. If sea water is converted to NaOH by using the slaked lime obtained and then NaOH is added to fresh sea water to remove Mg as $Mg(OH)_2$ and then carbon dioxide is added to remove Ca as $CaCO_3$, there is provided a more economical process for the purification of sea water.

In this case, however, there is some influence exerted by the $SO_4^{--}$ present in the sea water. In the reaction of the OH-type resin with sea water, the Cl-type resin and the $SO_4$-type may both be formed. If the $SO_4^{--}$ is reacted with $Ca(OH)_2$, $CaSO_4$ is formed which may separate out, and thus it is necessary to remove the $SO_4^{--}$ beforehand.

Figure 2:
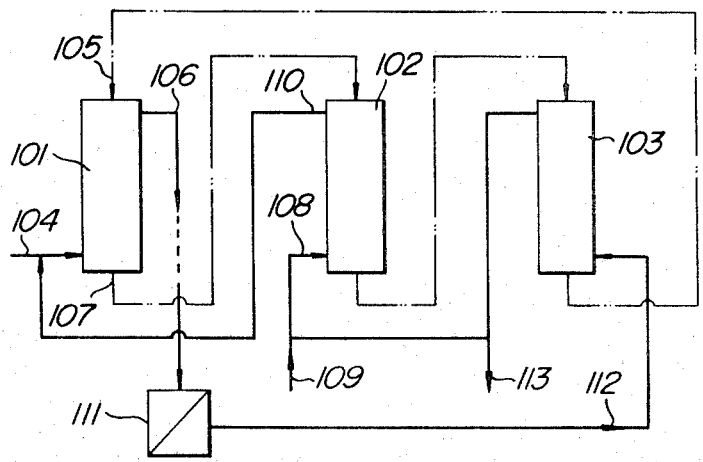

The prior removal of $SO_4^{--}$ with the apparatus of FIG. 2 will permit the further advantageous utilization of sea water since it permits the purification of sea water and the preparation of $Na_2SO_4$ simultaneously.

Explanation of this will next be made with reference to FIG. 2 in which is shown a first adsorbing vessel 101, a second adsorbing vessel 102 and a regenerating vessel 103. Previously diluted sea water 104 is introduced to the lower portion of the first adsorbing vessel 101, wherein countercurrent contact of said sea water is effected with a weakly basic Cl-type anion-exchange resin 105 introduced into the upper part of the vessel, and the sea water is freed from $SO_4^{--}$ to give partially purified sea water 106 at the upper portion of the vessel. The resin which has been converted into the $SO_4^-$ or Cl-form is transferred from resin discharge opening 107 at the lower portion of the vessel 101 to the upper part of the second adsorbing vessel 102.

In the second adsorbing vessel 102, $SO_4^-$ or Cl-type resin, which is introduced to the upper part thereof is countercurrently contacted with a $Na_2SO_4$ solution introduced through inlet 108 at the lower part of vessel 102. The $Na_2SO_4$ solution is obtained from the top of regeneration vessel 103 in which it has been used to regenerate the Cl-type resin. Before being introduced to vessel 102, the $Na_2SO_4$ solution is adjusted at 109 to the same concentration as that of the dilute sea water 104 introduced to vessel 101. Thus the resin is passed in the $SO_4$ form from the lower portion of the second vessel 102 to the upper portion of the regenerating vessel 103. The $Na_2SO_4$ solution is converted in 102 into NaCl solution which is removed from the upper part 110 of the second vessel for recycling as the liquid to be treated in the first adsorbing vessel. In this case, the concentration of the liquid fed in the second adsorbing vessel is required to deviate to some extent from the regeneration equilibrium curve, and it is not always necessary to adjust said concentration to the same level as that of a liquid treated in the first adsorbing vessel.

In the regeneration vessel 103, the $SO_4$-type resin which is introduced to the upper part thereof is regenerated with by the partially purified sea water 106, which after being concentrated in concentrating vessel 111 is fed to the regenerating vessel 103, whereby the resin is converted to the Cl-type and is recycled into the first adsorbing vessel 101. The treated liquid obtained at the top of regenerating vessel 103 is substantially pure $Na_2SO_4$ solution of which a portion is removed as product $Na_2SO_4$ at 113 and a portion of which is the $Na_2SO_4$ recycled to vessel 102 via inlet 108.

Separation of $SO_4^{--}$ may be carried out by using, as a starting material, dilute sea water from which calcium and magnesium have been removed or a diluted waste liquid obtained by concentration of the said sea water through dialysis by means of ion-exchange membranes.

By the former method, the $SO_4$ is almost completely removed, thereby resulting in a highly pure sodium chloride. The latter method enables the more economically advantageous production of sodium sulfate. Accordingly, either one of these methods may be selected depending on the desired purpose of the entire process.

Figure 3:
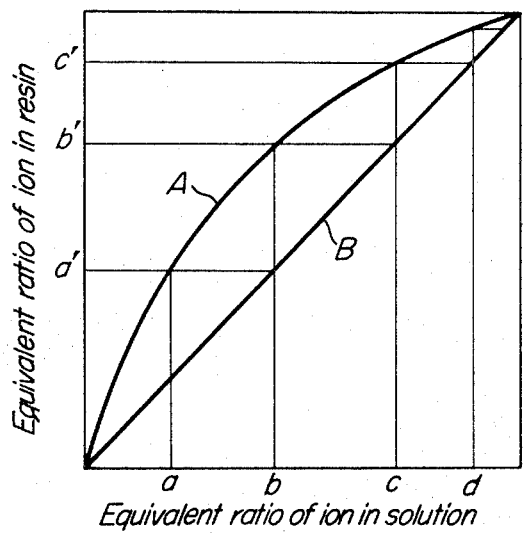

This situation will be explained in connection with the equilibrium curve shown in FIG. 3, wherein the horizontal axis represents the equivalent percentages of $Cl^-$ and $SO_4^{--}$ in the liquid and the vertical axis shows the equivalent percentage of both ions in the resins.

The equilibrium in this case is shown by curve A (upwardly convex). Similarly the equilibrium with $SO_4^{--}$ in the regenerating liquid as shown by curve B (straight line).

At the beginning of the operation, a resin which is contacted with a liquid $a$ to be treated in the first adsorbing vessel will have the composition $a'$ and is passed into the second adsorbing vessel. At first, liquid feed into the second adsorbing vessel is absent and so the said resin is directly passed into the regenerating vessel. In the course of reaction within the regenerating vessel, the regenerating liquid has the composition $b$. In the prior art, the composition $b$ is exhausted as a regenerating liquid to give a liquid mixture containing Cl⁻ approximately equivalent to SO₄⁻⁻.

In the present process, however, a part of the liquid $b$ is adjusted to the same equivalent concentration as that of the treated liquid of the adsorbing vessel, and the liquid thus obtained is fed to the second adsorbing vessel wherein it is contacted with the resin to have the composition $b'$. Then, the resin is passed into the regenerating vessel. The regenerating liquid then has the composition $c$, and a part of it is introduced into the second adsorbing vessel to have the composition $c'$. The procedures are repeated, and all parts of the resin other than that required for the proceeding reaction is completely regenerated in only the $SO_4^{--}$ adsorbed form, and therefore, a liquid containing only $SO_4^{--}$ is obtained as the treated liquid from the regeneration vessel.

This invention is applicable not only to the case where the ions to be separated are anions and cations, but also to the case where there are more than two ions, for instance where NaCl and impurities ($Ca^{++}$ and $Mg^{++}$) in sea water are to be removed. In the latter case, it is possible to separate NaCl from the mixture of $Mg^{++}$ and $Ca^{++}$ which are in turn separable by repeating the same procedures.

The above reaction proceeds as the result of the difference in the relationship of equilibrium, and so there is no need for any special management. Further, it is not necessary to use regenerating agents other than the liquid to be treated, i.e., sea water. By providing a second adsorbing vessel between the first adsorbing vessel and the regenerating vessel, it is possible to effect utilization of sea water very economically and efficiently.

The present invention allows economical production of NaOH from sea water. Further, it allows purification of sea water while providing NaCl of good quality, while Mg and $SO_4$ are separated. Thus, systematic utilization of the main components of sea water, Na, Mg, Cl and $SO_4$ is achieved.

The present invention is illustrated without limitation in the following examples:

Example 1

Sodium sulfate is produced by removal of $SO_4$ from Ca- and Mg-free dilute sea water and by use of concentrated sea water for regeneration of the resins. Dilute sea water which has been freed from Ca and Mg is countercurrently contacted at a flow rate of 1 m.³/hr. with a Cl-type weakly basic anion-exchange resin introduced into the upper portion of the first adsorbing vessel. A part of the resin is converted to $SO_4$-type. In this case, the dilute sea water used contains Cl⁻ 0.5 N and $SO_4^{--}$ 0.05 N. The resin equivalent to this is R–$SO_4$ 0.6 meq./R cc. and R–Cl 1.4 meq./R cc.

After ion exchange in the first adsorbing vessel, the resin (R–$SO_4$ and R–Cl) is passed to the second adsorbing vessel in which the resin is contacted with the $Na_2SO_4$ liquid from the regenerating vessel, thereby to have complete conversion to the $SO_4$-type resin which is in turn passed to the regenerating vessel.

At this stage, the resin composition is R–$SO_4$ 1.98 meq./R cc. and R–Cl 0.02 meq./R cc. In the regenerating vessel, the resin R–$SO_4$, which was transferred from the second adsorbing vessel, and concentrated sea water (NaCl, 200 g./l.) are brought into contact thereby to produce a $Na_2SO_4$ solution (242 g./l.). The treated liquid has the following composition:

|  | G./l. |
|---|---|
| $Na_2SO_4$ | 242 |
| NaCl | <1 |

In the concentrated sea water used for regeneration, the amount of NaCl is four times the equivalent of the $Na_2SO_4$ formed.

Example 2

In the process in which sea water free of Ca and Mg is dialyzed at 1 m.³/hr. by means of an ion exchange membrane thereby producing approximately 4.0 N NaCl solution, $Na_2SO_4$ is manufactured from the dilute waste solution resulting from said dialysis. Assuming the utilization rate of Cl⁻ in the dialysis of sea water to be 50%, the permeation rate of $SO_4^{--}$ through membrane, due to its selectivity, could be held to 25%, and as a result, the composition of said dilute waste solution will be as follows:

|  | Eq./l. |
|---|---|
| Cl⁻ | 0.250 |
| $SO_4^{--}$ | 0.038 |

On the other hand, the concentrated liquid has the following composition:

|  | Eq./l. |
|---|---|
| Cl⁻ | 4.00 |
| $SO_4^{--}$ | 0.20 |

The dilute waste liquid is passed to the first adsorbing vessel in which the liquid is brought into contact with the Cl-type resin, a part of which is converted to the $SO_4$-type. At this stage, the resin has the following composition:

|  | Meq./R cc. |
|---|---|
| R–$SO_4$ | 1.10 |
| R–Cl | 0.90 |

The resin similarly acts in the second adsorbing vessel as in Example 1 and then passes to the regenerating vessel. The resin composition is:

|  | Meq./R cc. |
|---|---|
| R–$SO_4$ | 1.98 |
| R–Cl | 0.02 |

In the regenerating vessel, it is countercurrently contacted with concentrated sea water to give $Na_2SO_4$ solution (243 g./l.).

In this case, because of the presence of some $SO_4^{--}$ in the concentrated sea water, $SO_4^{--}$ as much as 0.05 meq./R cc. remains in the regenerated resin, but this is not injurious.

The NaCl amount in the concentrated sea water used for regeneration is about 1.98 times the $Na_2SO_4$ formed.

Example 3

A sodium hydroxide solution is prepared, and the removal of Ca and Mg ions from sea water is carried out by using this solution.

Sea water is treated at a rate of 10 m.³/hr., and the composition of the sea water employed for this production of sodium hydroxide is as follows:

|  | N |
|---|---|
| Na | 0.4625 |
| Mg | 0.1065 |
| Ca | 0.0200 |
| Cl | 0.5350 |
| $CO_4$ | 0.0540 |

Figure 4:
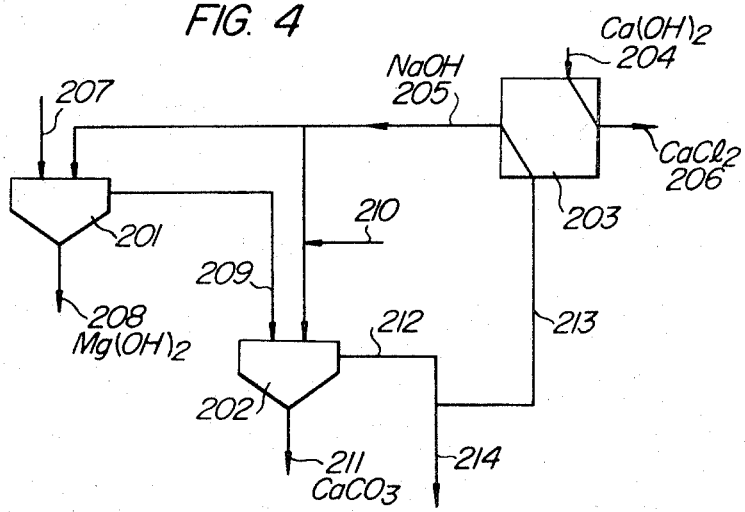

A dilute NaOH solution 205 (see FIG. 4), together with $CaCl_2$ 206, is first prepared in apparatus 203 from 1.34 keq./hr. of lime milch slurry 204 and 3.45 m.³/hr. of said sea water 213, from which Mg, Ca and $SO_4$ ions has been removed. The composition of NaOH thus formed is as follows, the resin in the OH-type being used at a rate of 1.22 keq./hr.

|  | N |
|---|---|
| NaOH | 0.353 |
| NaCl | 0.110 |

This dilute NaOH solution is subject to reaction with unpurified sea water 207 of 10 m.³/hr. in a quick sedimentation reaction vessel 201 of a slurry recirculation system for the formation and separation of $Mg(OH)_2$, 208, whereby Mg is removed. The OH ions are used herein at a rate of 1.07 keq./hr.

Then an amount of dilute NaOH solution equipvalent to 0.15 keq./hr. of OH is mixed with Mg-free sea water 209 in a quick reaction vessel 202 and subjected to reaction. Then calcium is separated at a rate of 0.15 keq./hr. as $CaCO_3$, 211, by blowing $CO_2$ gas 210 thereinto.

Ca- and Mg-free sea water is obtained at a rate of 13.45 m.³/hr., 212, 3.45 m.³/hr., 213, part of which is recirculated to the NaOH-production vessel, and the balance, 10 m.³/hr., 214, is withdrawn to be used in the preparation of NaCl.

What is claimed is:

1. A process for recovering Na, Mg, Ca, Cl and $SO_4$ from sea water in utilizable form, said process comprising the steps of separating Mg from sea water as $Mg(OH)_2$ by treating said sea water with sodium hydroxide; said sodium hydroxide being prepared, with the use of a resin-transferable ion exchange apparatus comprising a liquid circulating zone packed with OH-type resin, a regenerating zone and a water-washing zone, by feeding sulfate free sea water into the liquid-circulating zone to partially convert the NaCl in the sea water to sodium hydroxide, feeding a resin which has been converted into a Cl-type resin in said liquid circulating zone into an upper region of the regenerating zone, the said regenerating zone being a continuous ion-exchange apparatus of the movable bed type provided with liquid inlet and resin discharge openings in a bottom region of the regenerating zone and including a hopper with a resin reservoir connected to the top of the regenerating zone; feeding a slurry of lime milch into a central region of the regenerating zone, and feeding water through the liquid inlet at the bottom region of the regenerating zone, while withdrawing a calcium chloride solution from the top of the regenerating zone, thereby countercurrently contacting the liquid with the resin to regenerate the same to the OH-type, water-washing the latter said OH-type resin in the water-washing zone, and passing same to the liquid-circulating zone for reuse therein; separating Ca as $CaCO_3$ from the resulting Mg-free sea water with $Na_2CO_3$, said sodium carbonate being prepared by adding $CO_2$ gas to a part of the sodium hydroxide prepared in the preceding manner; separating $SO_4$ as $Na_2SO_4$ from the resulting Ca- and Mg-free sea water with the use of an ion exchange apparatus comprising a first adsorbing zone, a second adsorbing zone and a regenerating region, by contacting the sea water to be treated in the first adsorbing zone with a Cl-type ion exchange resin to produce sulfate-free sea water; concentrating a portion of the sulfate-free sea water discharged from the first adsorbing zone and passing the same to the regenerating region for use as a regenerating agent while collecting the remainder of the sulfate-free sea water discharged from the first adsorbing zone, withdrawing a solution of $Na_2SO_4$ from the regenerating region and passing a portion of same into the second adsorbing zone while collecting the remainder thereof, circulating the solution of NaCl withdrawn from the second adsorbing zone to the first adsorbing zone and contacting the same therein with the Cl-type resin obtained from the regenerating region; transferring the $SO_4$-type and Cl-type resin discharged from the first adsorbing zone to the second adsorbing zone, transferring the resin discharged from the second adsorbing zone to the regenerating region where same is converted to Cl-type resin, and transferring the Cl-type resin discharged from the regenerating region to the first adsorbing zone; and forming a concentrated aqueous NaCl solution by concentrating a major portion of the resulting Ca-, Mg- and $SO_4$-free sea water by electrodialysis.

References Cited

UNITED STATES PATENTS

| | | | |
|---|---|---|---|
| 2,559,529 | 7/1951 | Bauman | 210—37 |
| 2,683,649 | 7/1954 | Hirsch | 23—89 |
| 2,796,395 | 6/1957 | Roberts | 204—180 X |
| 2,884,310 | 4/1959 | Rosenberg et al. | 23—184 |
| 3,029,196 | 4/1962 | Matz et al. | 204—180 |
| 3,202,477 | 8/1965 | Loeffler et al. | 23—63 |
| 3,207,577 | 9/1965 | Mizuma | 23—125 |

OTHER REFERENCES

Calmon et al.: "Ion Exchange Technology," edited by Nachod et al., copyright 1956, Academic Press Inc., pp. 256–257.

EDWARD J. MEROS, Primary Examiner

U.S. Cl. X.R.

23--66. 89, 184, 201; 204—180; 210—37